No. 691,463. Patented Jan. 21, 1902.
L. GROTE.
FINISHING MOLD FOR MAKING GLASS BOTTLES.
(Application filed May 25, 1901.)
(No Model.) 2 Sheets—Sheet 1.

Witnesses
C. H. Walker
E. Thos. Loftus

Inventor
Ludwig Grote
Attorney

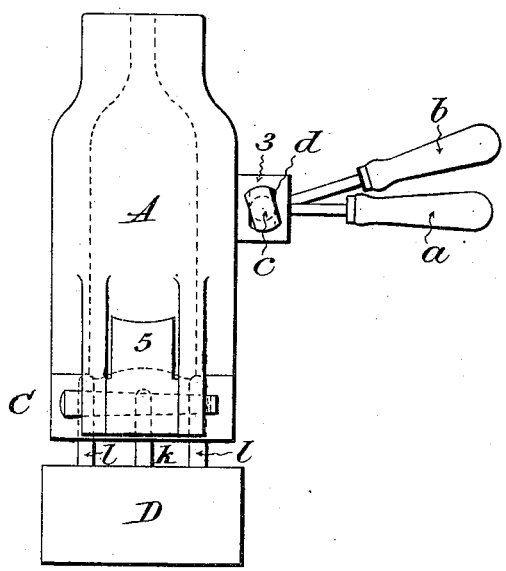
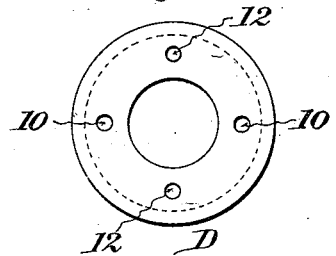
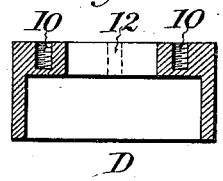
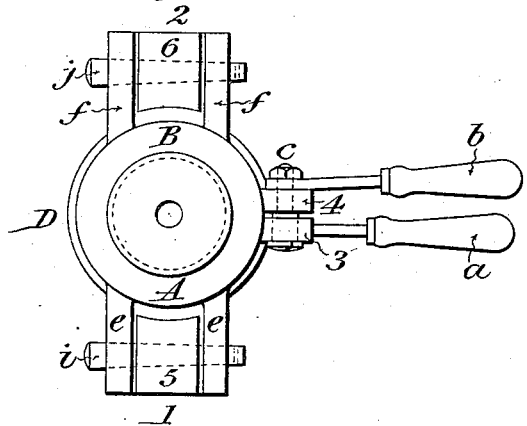
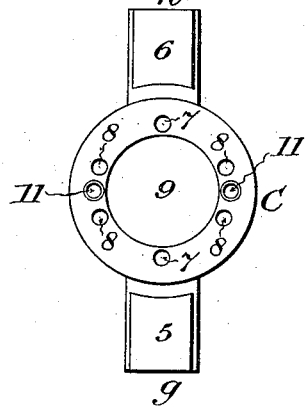

UNITED STATES PATENT OFFICE.

LUDWIG GROTE, OF LONDON, ENGLAND, ASSIGNOR TO GROTE BOTTLE MACHINE COMPANY, OF JERSEY CITY, NEW JERSEY, A CORPORATION OF NEW JERSEY.

FINISHING-MOLD FOR MAKING GLASS BOTTLES.

SPECIFICATION forming part of Letters Patent No. 691,463, dated January 21, 1902.

Application filed May 25, 1901. Serial No. 61,908. (No model.)

*To all whom it may concern:*

Be it known that I, LUDWIG GROTE, a subject of the Emperor of Germany, residing at 84$^B$ East India Dock road, Poplar, London, England, have invented a new and useful Improvement in Finishing-Molds for Making Glass Bottles, of which the following is a specification.

This invention relates to "finishing" body and bottom molds for use in the art of making glass bottles and primarily to such molds for use in connection with but detached from machines for making bottles—such, for example, as either of the machines set forth in my previous specifications forming parts of United States Letters Patent No. 628,313, dated the 4th day of July, 1899, and No. 656,286, dated the 21st day of August, 1900. In such machines the molten glass for each bottle is measured, the head is cast, the interior of the neck is formed, and the blowing is begun within neck and parison molds forming part of the machine. The parison is then inclosed within a finishing-mold and the blowing completed, whereby the body and bottom of the bottle are given their final shape and dimensions.

For the purposes of the present invention the head of the bottle may be formed and the measuring and blowing operations may be performed in any known or improved manner.

The objects of this invention are to facilitate quickly and tightly closing the joints of the mold and by the same means to facilitate throwing open the mold to free the finished bottle preparatory to its removal from the mold.

The invention consists in an improved finishing body and bottom mold and in certain novel combinations of parts therein, as set forth in the following description, and pointed out in the appended claims.

Two sheets of drawings accompany this specification as part thereof.

Figure 1:
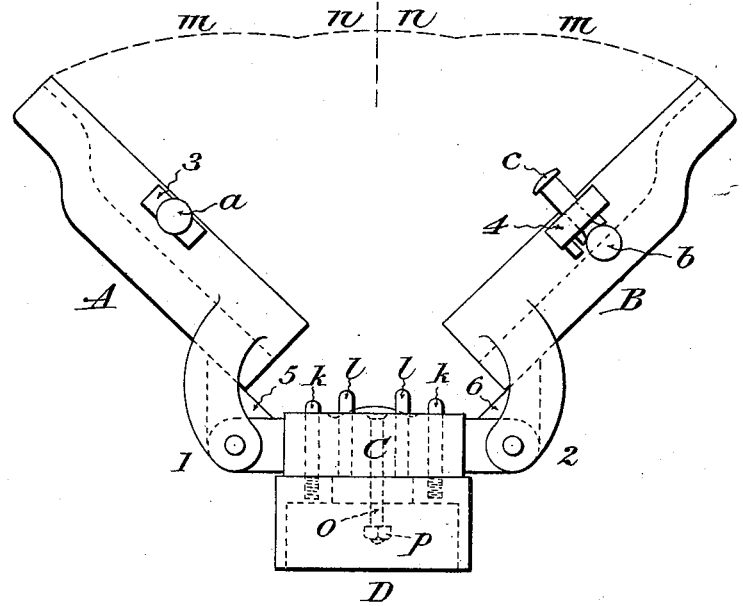
Figure 2:
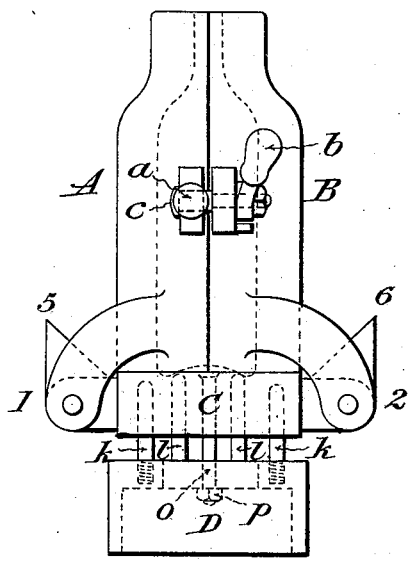

Figure 1 is a front elevation of the improved finishing-mold open. Fig. 2 is a like view of the same closed. Fig. 3 is an elevation of the closed mold from one of its hinge sides. Fig. 4 is a plan view projected from Fig. 3. Fig. 5 is a plan view of the bottom-molding part detached, and Figs. 6 and 7 are respectively a vertical section and a plan view of the base of the improved mold detached.

Like letters and numbers refer to like parts in all the figures.

The body-molding portion of the improved finishing-mold is bisected longitudinally, and its halves A and B swing together and apart, as is customary, on hinges 1 and 2, the axes of which are parallel to the plane of the longitudinal joints between said halves or body parts. The body parts A and B are thus hinged to a vertically-movable bottom-molding part C, Fig. 5, hereinafter termed the "bottom" part, beneath which is a base D, Figs. 6 and 7.

The body parts A and B are constructed, as is customary, with mid-height lugs 3 and 4 at one side of the mold, herein termed its "front," and handles $a$ and $b$ are respectively rigidly attached to said lug 3 and pivotally attached to said lug 4, the latter by a locking-bolt $c$, having a non-circular head which passes through a hole $d$, Fig. 3, of like shape in said lug 3, and is interlocked with the latter when the mold is closed by swinging the handle $b$ into the position in which it is shown in Figs. 2 and 3.

The body parts A and B are further constructed with lugs $e$ and $f$, Fig. 4, which coact with diametric lugs $g$ and $h$, Fig. 5, on the bottom part C and with pintles $i$ and $j$, Fig. 4, to form the hinges 1 and 2, said lugs $g$ and $h$ on the bottom part being preferably and conveniently provided with the customary stops 5 and 6, Figs. 1 to 5, against which the body parts rest when the mold is open, as in Fig. 1, as means for limiting the separation of said body parts.

The hinges 1 and 2 are necessarily loose-jointed, so as not to be affected by the changes of temperature of the mold and so that the mold, whether hot or cold, may be quickly opened and closed. Such looseness of the hinges militates against adapting the body parts to properly come together along their longitudinal joints, especially at the back of the mold, (shown at the left in Figs. 3 and 4,)

which is opposite the handles a and b, that have heretofore been relied on for this purpose.

To assist in bringing the body parts A and B tightly together when the mold is closed and at the same time tightly closing the joint between said body part and the bottom part C, the latter is made vertically movable, as aforesaid, and is constructed with vertical holes 7 and 8, Fig. 5, surrounding its matrical surface 9, Fig. 5. The base D is provided at top with tapped sockets 10, Figs. 6 and 7. Guide-pins k, Figs. 1, 2, and 3, are screwed fast in said sockets 10 and loosely fitted to said holes 7, and pins l, somewhat longer than the protruding portions of the pins k, rest loosely upon the base D and are loosely fitted to said holes 8 of the bottom part C.

The pins k and l are arranged to contact with the lower ends of the body parts A and B when the mold is closed, and their upper ends are rounded and project above the bottom part in the open mold with reference to such contact.

When the open mold, Fig. 1, is closed upon a parison by means of the handles a and b, the body parts A and B first move freely toward each other on the axes of the hinges 1 and 2 and describe by their upper angles the arcs m, Fig. 1. The lower ends of said body parts thus come in contact with the projecting upper ends of the pins k and l, first with the pins k nearest the axes of the hinges, so as to obtain the greatest leverage in overcoming the inertia of the bottom part C and its load, and then with the higher upper ends of the pins l in contact with which the body parts lift the bottom part until all the joints of the mold are tightly closed, as in Fig. 2. The compound movement of said upper angles of the body parts after the contact of the latter with the pins is represented by the arcs n, Fig. 1.

The mold is fastened in its closed condition by means of the handle b, as aforesaid. When it is unfastened, the weight of the bottom part C and its load assists in quickly opening the mold until the body parts A and B rest against the stops 5 and 6 and the bottom part upon the top of the base D again, as in Fig. 1.

The separation of the bottom part C and base D may be limited by any suitable means—as, for example, by one or more vertical screw-bolts o, Figs. 1 and 2, having countersunk upper ends which occupy holes 11, Fig. 5, in the bottom part C, and lower ends extending through holes 12, Figs. 6 and 7, in the top of the base D, and provided with nuts p, Figs. 1 and 2, to contact with the top of the chamber within the base, as in Fig. 2.

The external as well as the internal shape of the mold, and particularly those of the base D, may be widely varied at will, the pins k and l may be increased or reduced in number, and different means for fastening the mold may be used. Other like modifications will suggest themselves to those skilled in the art.

Having thus described said improvement, I claim as my invention, and desire to patent under this specification—

1. An improved finishing-mold, for making glass bottles, composed of a longitudinally-bisected body-molding portion, a vertically-movable bottom-molding part, having vertical holes therethrough, hinges uniting the body and bottom parts having horizontal axes parallel with the plane of the longitudinal joints of the mold, means for manipulating said body parts and fastening the mold, a base beneath said bottom part, vertical pins supported by said base, occupying said holes in the bottom part, and projecting above the latter in the open mold, to contact with the lower ends of said body parts, means for limiting the separation of said body parts, and means for limiting the separation of said bottom part and base.

2. The combination, in a finishing-mold for making glass bottles, of a pair of body parts forming a longitudinally-bisected body portion, a vertically-movable bottom part, hinges connecting said body and bottom parts having horizontal axes parallel with the plane of the longitudinal joints of the mold, means for manipulating said body parts and fastening the mold, a base beneath said bottom part, and upwardly-projecting pins supported by said base and contacting with the lower ends of said body parts.

3. The combination, in a finishing-mold for making glass bottles, of a pair of body parts forming a longitudinally-bisected body portion, a vertically-movable bottom part, hinges connecting said body and bottom parts having horizontal axes parallel with the plane of the longitudinal joints of the mold, means for manipulating said body parts and fastening the mold, a base beneath said bottom part, and vertical pins supported by said base, and contacting with the lower ends of said body parts.

4. The combination, in a finishing-mold for making glass bottles, of a pair of body parts forming a longitudinally-bisected body portion, a vertically-movable bottom part having vertical holes therethrough, hinges connecting said body and bottom parts having horizontal axes parallel with the plane of the longitudinal joints of the mold, means for manipulating said body parts and fastening the mold, a base beneath said bottom part and vertical guide-pins, attached to said base, occupying said holes in the bottom part, and projecting above the latter in the open mold, to contact with the lower ends of said body parts.

5. The combination, in a finishing-mold for making glass bottles, of a pair of body parts forming a longitudinally-bisected body portion, a vertically-movable bottom part having holes therethrough, hinges connecting said body and bottom parts having horizontal axes parallel with the plane of the longitudinal joints of the mold, means for manipulating said body parts and fastening the mold, a base beneath said bottom part, upwardly-projecting pins supported by said base, occupying said holes in the bottom part and projecting to different heights above the latter in the open mold, to contact with the lower ends of said body parts.

6. The combination, in a finishing-mold for making glass bottles, of a pair of body parts forming a longitudinally-bisected body portion, a vertically-movable bottom part having vertical holes therethrough, hinges connecting said body and bottom parts having horizontal axes parallel with the plane of the longitudinal joints of the mold, means for manipulating said body parts and fastening the mold, a base beneath said bottom part, vertical guide-pins, attached to said base, occupying holes in said bottom part and projecting above the latter near the hinges in the open mold, and loose pins, occupying holes in said bottom part farther from the hinges and projecting above said bottom part to a greater height in the open mold, to contact with the lower ends of said body parts.

7. The combination, in a finishing-mold for making glass bottles, of a pair of body parts forming a longitudinally-bisected body portion, a vertically-movable bottom part having vertical holes therethrough, hinges connecting said body and bottom parts having horizontal axes parallel with the plane of the longitudinal joints of the mold, means for manipulating said body parts and fastening the mold, located at one side of said body portion, and devices for causing said body parts to draw said bottom part upward when the mold is closed to equalize tightening the joints of the mold, said devices comprising vertical pins occupying said holes in the bottom part and projecting above the latter in the open mold to contact with the lower ends of said bottom parts, substantially as hereinbefore specified.

LUDWIG GROTE.

Witnesses:
 EARL A. BOWMAN,
 ADELBERT W. BAILEY.